United States Patent
Colombi et al.

(10) Patent No.: US 11,804,731 B2
(45) Date of Patent: Oct. 31, 2023

(54) METHOD FOR CONTROLLING AN UNINTERRUPTABLE POWER SUPPLY

(71) Applicant: ABB Schweiz AG, Baden (CH)

(72) Inventors: Silvio Colombi, Losone (CH); Andrea Mannuccini, Riazzino (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/573,354

(22) Filed: Jan. 11, 2022

(65) Prior Publication Data

US 2022/0224149 A1    Jul. 14, 2022

(30) Foreign Application Priority Data

Jan. 11, 2021   (EP) .................... 21150930.2

(51) Int. Cl.
*H02J 9/06* (2006.01)
*H02J 3/08* (2006.01)
*H02J 3/00* (2006.01)

(52) U.S. Cl.
CPC .............. *H02J 9/062* (2013.01); *H02J 3/007* (2020.01); *H02J 3/08* (2013.01); *H02J 9/061* (2013.01)

(58) Field of Classification Search
CPC .... H02J 9/062; H02J 3/08; H02J 9/061; H02J 3/32; H02J 7/02; H02J 9/068; H02J 7/0068; H02J 15/00
See application file for complete search history.

(56) References Cited

U.S. PATENT DOCUMENTS

| | | | |
|---|---|---|---|
| 9,735,616 B2 | 8/2017 | Colombi et al. | |
| 2006/0221523 A1 | 10/2006 | Colombi et al. | |
| 2013/0278216 A1* | 10/2013 | Son | H02J 7/0016 307/65 |
| 2014/0368043 A1* | 12/2014 | Colombi | H02J 3/32 307/66 |
| 2017/0070074 A1* | 3/2017 | Sugeno | H02J 9/062 |
| 2020/0389045 A1* | 12/2020 | Chen | H02J 9/066 |

FOREIGN PATENT DOCUMENTS

| | | |
|---|---|---|
| CN | 105518964 A | 4/2016 |
| CN | 106410952 A | 2/2017 |
| CN | 107732950 A | 2/2018 |
| EP | 3008786 A1 | 4/2016 |
| WO | 2019095766 A1 | 5/2019 |

* cited by examiner

*Primary Examiner* — Lincoln D Donovan
*Assistant Examiner* — Alex W Lam
(74) *Attorney, Agent, or Firm* — Armstrong Teasdale LLP

(57) ABSTRACT

A method for controlling an uninterruptable power supply arranged between a grid and a variable load, the uninterruptable power supply includes a DC link interconnecting a rectifier connected to the grid via a grid switch, an energy storage and an inverter connected to the load, and a switchable bypass connected between the grid switch and the load and in parallel with the path formed by the rectifier, the DC link and the inverter, the method includes monitoring a power supply of the grid, comparing the power supply to a load requirement of the load, if the power supply meets the load requirement, closing the grid switch, and switching on the bypass, to supply the load with AC current from the grid.

16 Claims, 2 Drawing Sheets

METHOD FOR CONTROLLING AN UNINTERRUPTABLE POWER SUPPLY

CROSS REFERENCE TO RELATED APPLICATIONS

This patent application claims the benefit and priority of European Patent Application No. 21150930.2 filed on Jan. 11, 2021, the disclosure of which is incorporated by reference herein in its entirety as part of the present application.

BACKGROUND

The disclosure relates to a method for controlling an uninterruptable power supply and a respective computer program. In particular, the disclosure relates to a control device for controlling an uninterruptable power supply and an uninterruptable power supply with such a control device.

If a variable load is connected to a grid, a drawable power from the grid is limited by a maximum power supply of the grid. The drawn power has to stay below or equal to the maximum power supply to keep the grid from collapsing or avoid penalties. To prevent an overload on the grid and to permanently disconnect the load from the grid in case of overload, a fuse may be arranged between the load and the grid.

If the variable load has a higher power demand than the grid is able to supply, the grid connection has to be upgraded.

BRIEF DESCRIPTION

Embodiments of the present disclosure provide an improved method for controlling an uninterruptable power supply and provide an economic and reliable uninterruptable power supply.

It is achieved by the subject-matter of the independent claims. Further exemplary embodiments are evident from the dependent claims and the following description.

The disclosure relates to a method for controlling an uninterruptable power supply arranged between a grid and a variable load, the uninterruptable power supply including a DC link interconnecting a rectifier connected to the grid via a grid switch, an energy storage and an inverter connected to the load, and a switchable bypass connected between the grid switch and the load and in parallel with the path formed by the rectifier, the DC link and the inverter, the method including monitoring a power supply of the grid, comparing the power supply to a load requirement of the load, if the power supply meets the load requirement, closing the grid switch, and switching on the bypass, to supply the load with AC current from the grid.

The load may be a charging station for electric vehicles, for example. An amount of power needed to charge the vehicles may heavily depend on a type of vehicle and on a type of charging technology used. For example, the variable load may need as little as around 10 kW to charge a compact vehicle, or need more than 400 kW to charge a long range vehicle. The power requirements may multiply when multiple vehicles are charged at the same time.

A rectifier and an inverter may be essentially identical electric components. The rectifier and the inverter may have a rectifying mode and an inverting mode. In the rectifying mode, the rectifier or inverter may be configured to draw AC current from the grid and supply DC current to the DC link. In the inverting mode the rectifier or inverter may be configured to draw DC current from the DC link and supply AC current at its other port. An inverter switch may be arranged between the inverter and the load. The inverter switch may be open while activating the inverter until an output from the inverter is stabilized. An energy storage may include a battery configured to store electric energy as chemical energy. The energy storage may also have a DC/DC converter to change a voltage of the DC link to a voltage of the battery. The DC link may typically include capacitors to provide an energy buffer. A bypass may have a bypass switch. The bypass switch may be a semiconductor switch that is switched electronically. The bypass may be connected to an entrance port of the rectifier and an exit port of the inverter. A grid switch may be arranged between the uninterruptable power supply and the grid. The grid switch may be a mechanical switch.

The grid switch may be closed by sending a grid switch closing signal to the grid switch. The bypass may be switched on by closing the bypass switch. The bypass switch may be closed by sending a bypass closing signal to the bypass switch. Load supply requirements may be defined as a voltage tolerance and/or a frequency tolerance. The load requirements may also include a power demand of the load. the power demand may be detected by sensing a change of at least an electrical variable on a connection between the uninterruptable power supply and the load. For example, a voltage drop may be detected on the connection. The demand may also be actively signaled by the load via a communication protocol.

The bypass may alternatively already be switched on, even before a power demand is detected. The power supply may meet the load requirements if a grid voltage is inside the voltage tolerance, if a grid frequency inside the frequency tolerance.

According to an embodiment, the method further includes monitoring a power demand of the load and a charge level of the energy storage, wherein the rectifier is activated in a rectifying mode and surplus AC current from the grid is rectified to DC current supplied to the DC link and the energy storage is charged by drawing DC current from the DC link, if a charge level of the energy storage is below a predetermined level and if there is a power surplus, where the power supply is higher than the power demand of the load. If the power demand drops or the power supply surges, the energy storage may buffer the surplus energy. The amount of power drawn by the rectifier may be controlled. The rectifier may draw up to a difference between the power demand and the possible power supply. The rectifier may draw surplus AC current up to its rectifying capacity.

According to an embodiment, if the surplus is bigger than a rectifying capacity of the rectifier, the inverter is operated in the rectifying mode, in which AC current is drawn from the grid over the bypass and is converted to DC current supplied to the DC link. That way, the inverter can support the rectifier in absorbing the excess energy. The power demand of the load is supplied over the bypass.

According to an embodiment, the surplus is balanced between the inverter and the rectifier. The inverter and the rectifier may share equal parts of the surplus. By balancing the loads on the inverter and rectifier, both converters may operate at a lower load than a maximum load.

According to an embodiment, the method further includes monitoring a power demand of the load, wherein if the power supply meets the load requirements and if there is a power shortfall, where the power supply is lower than the power demand, the shortfall is signaled to the load. The shortfall may be signaled via the communication protocol. The load may be able to limit its power consumption to the available power supply. For example, the charging station may restrain a charging speed of the connected electric vehicle.

According to an embodiment, if there is a power shortfall, the inverter is synchronized to the grid in an inverting mode and DC current from the DC link is inverted to AC current to supply the shortfall and the energy storage is discharged by supplying DC current to the DC link. The power supply may be limited. A maximum power supply may be defined by contract and/or by measuring at least one electric variable on the grid. The load may draw the maximum power from the grid via the bypass. The inverter may add power to satisfy the power demand after the inverter AC voltage is synchronized in phase and the voltage amplitude is matched. Once the inverter is synchronized, a load share control may be activated to share the load current between the grid and the inverter. in the desired proportion. The inverter may be operated as a voltage source with the inverter reference voltage adapted to control the load share. In another implementation the inverter may be operated as a current source. As a current source, the inverter just pushes current to enable the load to draw more power than the grid is able to provide. Until the inverter is synchronized, a limitation signal to the load may limit a power consumption of the load. It is advantageous to control the inverter as a voltage source and add a load share control to share the load current between the inverter and the grid. The advantage is that if the grid collapses the grid voltage will disappear and inverter will automatically impose the load voltage. If the inverter is controlled as a current source and the grid disappears, the inverter control may be shifted from current source to voltage source.

According to an embodiment, the rectifier is operated in the inverting mode, in which in which DC current is drawn from the DC link and converted to AC current supplied to the load via the bypass, if the bypass is switched on and if the shortfall is bigger than an inverting capacity of the inverter. The rectifier may support the inverter in supplying the demanded power.

According to an embodiment, the shortfall is balanced between the inverter and the rectifier. The inverter and the rectifier may supply equal parts of the shortfall. By balancing the loads on the inverter and rectifier, both converters may operate at a lower load than a maximum load.

According to an embodiment, the grid switch is closed, the bypass is opened, the rectifier is activated in a rectifying mode to rectify AC current from the grid to DC current supplied to the DC link, and the inverter is activated in an inverting mode to invert DC current from the DC link to AC current supplied to the load, if the power supply is below the load requirements but meets rectifier requirements. Rectifier requirements may be lower than the load requirements. The rectifier may have a bigger voltage tolerance than the load. The rectifier may have a bigger frequency tolerance than the load. The inverter may supply the load with power within the load requirements. If there is a power shortfall, the energy storage may be discharged to supply the DC link with DC current. If the energy storage is below a predetermined charge level and if there is a power surplus, the energy storage may be charged.

According to an embodiment, the grid switch is opened, the inverter is activated in an inverting mode to invert DC current from the DC link to AC current supplied to the load and the energy storage is discharged, if the power supply is below the rectifier requirements. The uninterruptable power supply may be disconnected from the grid and the complete power demand may be supplied from the energy storage, if the power supply is below the rectifier requirements. The power supply may be below the rectifier requirements, if the grid has a voltage outside the voltage tolerance of the rectifier, a frequency outside the frequency tolerance of the rectifier. If for example, the grid collapses, the uninterruptable power supply can take up the slack and can completely substitute the grid.

According to an embodiment, the bypass is switched on and the rectifier is operated in the inverting mode to invert DC current from the DC link to AC current supplied to the load via the bypass, if the power demand is bigger than an inverting capacity of the inverter. The rectifier may be operated as a current source and the inverter may be operated as a voltage source. The inverter may define the voltage for the load. The rectifier may push current to the load. That way voltage control is efficient, as the inverter and rectifier don't counteract each other.

The disclosure further relates to a computer program, which when being executed by a processor, is adapted for performing the method of one of the previous embodiments.

The disclosure further relates to a computer-readable medium, in which a computer program according to an embodiment is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory), or a FLASH memory. A computer readable medium may also be a data communication network, e.g. the Internet, which allows downloading a program code. In general, the computer-readable medium may be a non-transitory or transitory medium.

The disclosure further relates to a control device for an uninterruptable power supply, configured to execute the method of one of the previous embodiments.

The disclosure further relates to an uninterruptable power supply device, including a rectifier and an inverter interconnected via a DC link, an energy storage connected to the DC link, and a bypass switch, which is connected in parallel to the rectifier, DC link and inverter between the grid and the load, including a control device according to an embodiment.

According to an embodiment the bypass switch includes two anti-parallel thyristors. A thyristor may be electrically conducting in one direction, while being nonconducting in the opposite direction. Therefore, to conduct the AC current with changing directions of the electric current, two thyristors arranged in opposite directions may be connected in parallel to each other. The thyristors may be switched to a conducting state by the closing signal and stay conductive without upholding the closing signal. Likewise, the thyristors may be switched to a nonconducting state by an opening signal and stay nonconductive without upholding the opening signal.

According to an embodiment the energy storage includes a battery. A battery may be an electrochemical energy storage. While the battery is charged, electric energy is converted to chemical energy stored in the battery. While the battery is discharged, the chemical energy in the battery is converted to electric energy. Other energy storage devices can be used instead of batteries. Energy may be stored in flywheels or fuel cells for example.

These and other aspects of the disclosure will be apparent from and elucidated with reference to the embodiments described hereinafter.

BRIEF DESCRIPTION OF THE DRAWINGS

The subject matter of the disclosure will be explained in more detail in the following text with reference to exemplary embodiments which are illustrated in the attached drawings.

In the drawings, identical parts are provided with the same reference symbols in the figures.

DETAILED DESCRIPTION

Figure 1:
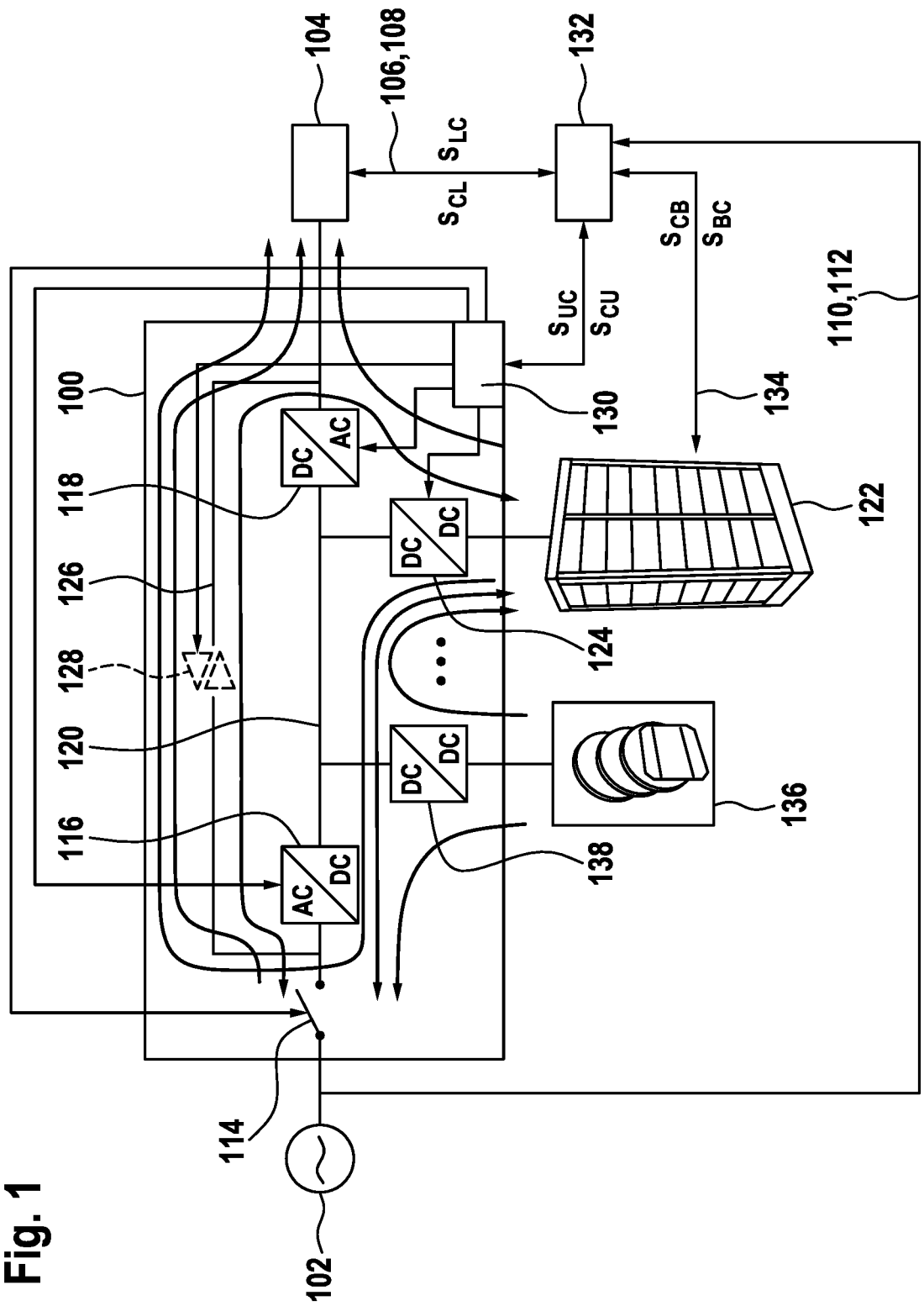
FIG. 1 is a schematic view of an uninterruptable power supply according to an embodiment of the present disclosure.

FIG. 1 schematically shows an uninterruptable power supply 100 according to an embodiment. The uninterruptable power supply 100 is interconnected between a grid 102 and a load 104.

The load 104 may be a charging station for electric vehicles, for example. The load 104 may have a varying power demand 106 and predetermined load requirements 108. The power demand 106 may depend on the type of vehicle being charged, for example. The load requirements 108 may depend on electric constraints of the load 104. The load requirements 108 may represent a voltage tolerance of the load 104 and/or a frequency tolerance of the load 104.

The grid 102 may have a limited power supply capability 110. The limited power supply capability 110 may be due to a bottleneck in the grid and/or varying other loads on the grid 102. The bottleneck may be a given cable cross-section of the grid 102. A power quality 112 of the power supply 110 may also be variable. For example, a voltage of the grid 102 and/or a frequency of the grid 102 may be variable and/or be dependent on a total load on the grid 102.

A grid switch 114 of the uninterruptable power supply 100 is arranged between a grid connection of the uninterruptable power supply 100 and a rectifier 116 of the uninterruptable power supply 100. The grid switch 114 may be a mechanical switch. The rectifier 116 and an inverter 118 of the uninterruptable power supply 100 are interconnected via a DC link 120. An energy storage 122 is connected to the DC link 120. The energy storage 122 is a battery in this example. The energy storage 122 includes a battery converter 124 to convert between a voltage of the DC link 120 and a voltage of the battery. A load connection of the uninterruptable power supply 100 is arranged between the inverter 118 and the load 104. A switchable bypass 126 of the uninterruptable power supply 100 is connected in parallel to the rectifier 116, the DC link 120 and the inverter 118 between the grid switch 114 and the load connection. A bypass switch 128 is arranged in the bypass 126. The bypass switch 128 may be a semiconductor switch. The uninterruptable power supply 100 may be a multi-phase uninterruptable power supply 100. For reasons of clarity, only one phase is shown.

The uninterruptable power supply 100 has a control device 130. The control device 130 is connected to the grid switch 114, the rectifier 116, the inverter 118, the battery converter 124, and the bypass switch 128. The control device 130 is further connected to a monitoring device 132, that monitors the grid 102, the energy storage 122, and the load 104. The monitoring device 132 monitors the power supply 110 and the power quality 112 of the grid 102, the power demand 106 of the load 104 and a charging state 134 of the energy storage 122. The load requirements 108 are predefined and known beforehand. The monitoring device 132 may also be incorporated in the control device 130.

In an embodiment, the control device 130 is directly connected to the load 104. The load 104 and the control device 130 communicate with each other via a communication protocol. The load 104 may signal its power demand 106 and the control device 130 may signal the momentarily available power supply 110. The load 104 may also communicate its load requirements 108. The load 104 may adjust its power consumption to the available power supply 110.

When a power demand 106 of the load 104 is registered, it is compared to the power supply 110 of the grid 102. The power quality 112 of the grid 102 is compared to the load requirements 108.

If the power demand 106 is smaller or equal to the power supply 110 and if the power quality 112 is bigger or equal to the load requirements 108, the power demand 106 is satisfied directly from the grid 102. To satisfy the power demand 106, the grid 102 and the load 104 are interconnected by the bypass 126. To connect the load 104 to the grid 102, the grid switch 114 and the bypass switch 128 need to be in a closed state. If the grid switch 114 and/or the bypass switch 128 are open, the grid control device 130 sends a closing signal to the grid switch 114 and/or the bypass switch 128. If the grid switch 114 and/or the bypass switch 128 are already closed, the control device 130 keeps them that way.

If there is a power surplus, where the power demand 106 is smaller than the power supply 110 or if no power demand 106 of the load 104 is registered, if the power quality 112 is bigger or equal to the load requirements 108 and if the charging state 134 is less than full, the rectifier 116 is activated in a rectifying mode and the energy storage 122 is charged. The charging may happen in addition to supplying the power demand 106 over the bypass 126.

In the rectifying mode the rectifier 116 draws alternating current (AC) from the grid 102 and feeds rectified direct current (DC) to the DC link 120. To draw alternating current (AC) from the grid 102, the grid switch 114 needs to be in a closed state. If the grid switch 114 is open, the control device 130 closes the grid switch 114. The rectifier 116 controls the voltage of the DC link 120 to the required voltage by drawing the appropriate currents from the grid. These currents may be sinusoidal and in phase with the respective grid voltage in order to obtain a unity power factor. The bidirectional dc/dc battery converter 124 coupled to the energy storage 122 transfers power from the DC link 120 to the battery until the battery is fully charged. The rectifier 116 is controlled to keep the voltage of the DC link 120 within a tolerance band.

If the power surplus is bigger than a rectifying capacity of the rectifier 116, the inverter 118 is activated in a rectifying mode. In the rectifying mode the inverter 118 draws alternating current (AC) from the grid 102 over the bypass 126 and feeds rectified direct current (DC) to the DC link 120. The control device 130 may balance the surplus between the inverter 118 and the rectifier 116.

If there is a power shortfall, where the power demand 106 is bigger than the power supply 110, if the power quality 112 is bigger or equal to the load requirements 108 and if the charging state 134 is above a limit, the inverter 118 is activated in an inverting mode. If the energy storage 122 was charged before the shortfall, the charging is suspended. The shortfall may be signaled to the load 104.

In the inverting mode the inverter 118 draws direct current (DC) from the DC link 120 and feeds inverted alternating current (AC) to the load 104. The direct current (DC) drawn by the inverter 118 is supplied by the energy storage 122. Until the inverter 110 is ready to supply the shortfall, the load 104 may limit its power consumption to the available power supply 110.

If the power shortfall is bigger than an inverting capacity of the inverter 118, the rectifier 116 is activated in an inverting mode.

In the inverting mode the rectifier 116 draws direct current (DC) from the DC link 120 and feeds inverted alternating current (AC) to the load 104 via the closed bypass switch 128, so that the power demand 106 is supplied by both the inverter 118 and the rectifier 116. The control device 130 may balance the power demand 106 between the inverter 118 and the rectifier 116.

If the power quality 112 doesn't meet the load requirements 108, the grid 102 and the load 104 cannot be connected directly. The control device has to separate the load 104 from the grid 102. If the power quality 112 still meets rectifier requirements, the grid switch 114 is closed or kept closed and the bypass switch 128 is opened or kept open, the rectifier 116 is operated in the rectifying mode and the inverter 118 is operated in the inverting mode.

If the power demand 106 exceeds the inverting capacity of the inverter 118, the grid switch 114 is opened or kept open, the bypass switch 128 is closed or kept closed and the rectifier 116 is operated in the inverting mode so that the power demand 106 is supplied by both the inverter 118 and the rectifier 116. The control device 130 may balance the power demand 106 between the inverter 118 and the rectifier 116.

If the power quality 112 doesn't meet the rectifier requirements 108, the grid switch 114 is opened.

In an embodiment, the uninterruptable power supply 100 is connected to a secondary power source 136. The power source 136 may be a solar power plant, for example. The power source is connected to the DC link 120 via a power converter 138. The power source 136 supplies DC current (DC) to the DC link 120. The supplied DC current (DC) may be used to charge the energy storage 122 or to invert DC current (DC) to AC current (AC) in the inverter 118 and/or the rectifier 116.

The uninterruptable power supply 100 may also be used to supply AC current (AC) to the grid 102. As long as the power demand 106 is satisfied, excess inverting capacity of the inverter 118 and the rectifier 116 may be used to support the grid 102. To supply AC current (AC) to the grid 102 the grid switch 114 needs to be closed or be kept closed.

Figure 2:
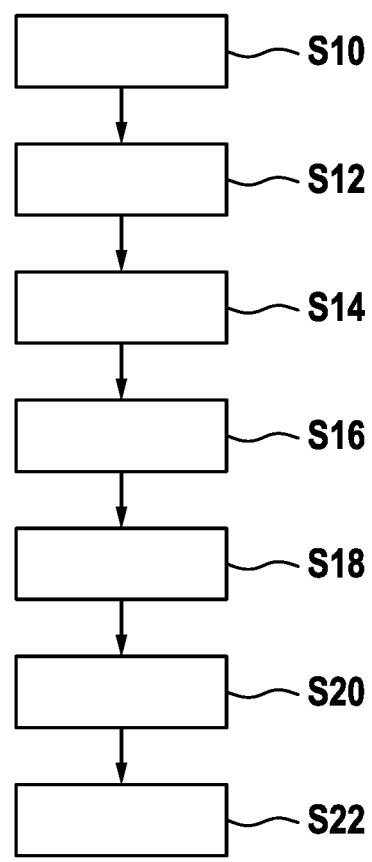
FIG. 2 is a flow diagram for a method for controlling an uninterruptable power supply of FIG. 1 according to an embodiment of the present disclosure.

FIG. 2 shows a flow diagram for a method for controlling the uninterruptable power supply of FIG. 1. In step S10 the power supply of the grid is monitored. In step S12 the power supply is compared to load requirements of the load. In step S14, if the power supply meets the load requirements, the grid switch is closed and the bypass is switched on, to supply the load with AC current from the grid.

In an embodiment, in step S10 a power demand of the load and a charge level of the energy storage are monitored. In step S12 the power supply is compared to the power demand and the charge level is compared to a predetermined level. In step S16, if the charge level of the energy storage is below the predetermined level and if there is a power surplus, where the power supply is higher than the power demand, the rectifier is activated in a rectifying mode to rectify surplus AC current from the grid to DC current supplied to the DC link, wherein the energy storage is charged with the DC current.

In an embodiment, in step S18, if there is a power shortfall, where the power supply is lower than the power demand, the shortfall is signaled to the load.

In an embodiment, in step S20, if there is the power shortfall, the inverter is synchronized to the grid in an inverting mode to invert DC current from the DC link to AC current to supply the shortfall, wherein the energy storage is discharged. In this case, the inverter and the grid are both supplying power to the load and the inverter can be controlled to share the load in the desired amount with the grid, for example in order to not exceed the maximal grid power available.

In an embodiment, in step S22, if the shortfall is bigger than an inverting capacity of the inverter, the rectifier is operated in an inverting mode to invert DC current from the DC link to AC current and supply the load via the bypass wherein the energy storage is discharged. In this case, the load current is shared in the desired proportion between the grid, the inverter, and the rectifier.

In an embodiment, in step S12 the power supply is compared to rectifier requirements. In step S14, if the power supply is below the load requirement but meets the rectifier requirements, the bypass is switched off. In step S16 the rectifier is activated in the rectifying mode to supply DC current to the DC link. In step S20 the inverter is activated in the inverting mode to supply the load.

In an embodiment, if the charge level of the energy storage is below the predetermined level and if there is the power surplus, the energy storage is charged with the DC current.

In an embodiment, in step S14, if the power supply is below the rectifier requirements, the grid switch is opened. In step S20 the inverter is activated in the inverting mode to supply the load, wherein the energy storage is discharged.

In an embodiment, if the power demand is bigger than the inverting capacity of the inverter, in step S14, the bypass is switched on and in step S22 the rectifier is operated in the inverting mode and injects the desired amount of current to supply the load via the bypass, wherein the energy storage is discharged.

Existing electrical infrastructure cannot accommodate the large additional load for charging electric vehicles without significant, expensive, and disruptive infrastructure upgrades. There is a need for grid friendly charging installations that limit the power drawn from the grid using an additional energy reservoir. A similar application is peak shaving in industrial and building applications The solution proposed here is a modular multifunction UPS allowing full converter usage as well as multiple operation modes and smooth transitions between modes.

Rectifier and/or inverter usage may be maximized by adding additional battery converter(s) and dedicated operating modes. Operation in full discharge mode may be done either by disconnecting the rectifier from the grid (grid switch open) or in parallel operation with the grid (grid switch closed) using specific controls. A flexible solution is proposed to optimize energy flows between multiple energy sources and loads while providing low harmonic distortion of currents and voltages. The UPS allows operation in island mode, black start, on-grid, and smooth transitions between modes.

The grid providers distribute power through the grid to the users. This relationship is defined contractually and depends typically by the consumption of active power P and reactive power Q. Different tariffication schemes are possible and may involve the maximal active power Pmax and reactive power Qmax. In addition, the current absorbed by the load may not be sinusoidal creating therefore a current distortion THDI (Total Harmonic Distortion) that typically has to be limited at the point of connection.

Many applications exist where the user needs to draw more power than the maximal allowed, either to overcome infrastructure limitations and/or to avoid penalties from grid providers.

A BESS (Battery Energy Storage System) is basically a battery coupled to an inverter connected to the grid with different controls allowing the exchange of active (P), reactive (Q), and harmonic power (H). Different functionalities are possible, e.g., peak shaving and/or harmonic active filtering. For the peak shaving function, when the power drawn from the load is greater than a certain limit Pmax, the BESS will inject active power P such that at the connection point the total power absorbed stays below Pmax. In addition, the BESS may also inject reactive power Q and compensate for current distortions.

A conventional double conversion UPS may be generally composed of a rectifier (R), an inverter (I), a battery converter (BC), and a bypass (Byp). A battery may generally be connected to the battery converter. Typically, there are three operation modes: double conversion, bypass, and battery discharge. The normal operation mode is double conversion where the grid is available, the battery is charged and the load is fed through the double conversion path formed by rectifier and inverter. If the grid is not available, the load is seamlessly fed from the inverter that is taking power from the battery through the battery converter. Finally, in case of some internal failures when in double conversion mode, the load is fed through the bypass. Normally, the rectifier is controlled in current to draw sinusoidal currents from the grid at unity power factor while the inverter is controlled in voltage to generate a clean sinusoidal voltage to supply the load.

When there is a need to limit the active power from the grid, a command is sent to the rectifier of the UPS to limit the power absorption to Pmax, the remaining power is taken from the battery through the battery converter and the inverter. Typically, a Li-Ion battery is used as an energy storage.

As an example, for fast EV battery charging, the load is a supercharger. During fast EV battery charging, the battery and the grid provide respectively 6/7 and 1/7 of the total power required. The rectifier draws already sinusoidal currents from the grid in phase with the grid voltages. The active power drawn from the grid can be limited to the desired value while both the reactive power and the current distortion can be compensated. The power of the three UPS converters can be optimized to reduce cost. For example, if a load requires a power Pload and the grid power needs to be limited to Pgrid (where Pgrid<Pload), then the optimal power for the rectifier is Pgrid<Pload while Pload is the power needed for both the battery converter and the inverter.

The new solution described here is a UPS with multi-function capabilities. With respect to a traditional UPS the new concept includes a grid switch at the UPS input as well as a double power battery converter. This may be provided by two single power battery converters, but it can be a single battery converter block having double power. The advantage of this solution is that it allows a much better usage of all the UPS converters. If the load requires a power of Pload=400 kW and the power available from the grid is 50 kW, for the presented solution, a standard 200 kW UPS can be used with only a double power battery converter, i.e. 200 kW rectifier and inverter and 400 kW battery converter capacity.

In recharge mode, various options are possible. The grid switch is closed. The battery may be charged through the rectifier or over the bypass and through the inverter. For other applications where the battery needs to be recharged very fast at high power, both paths combined can be used.

In discharge mode various operation modes are possible. The grid switch is typically closed when the grid is available, and power can be drawn from the grid. On the other hand, when the grid is not available, or it is not possible to draw power from the grid then the grid switch is opened. Typically, this can happen when the grid voltages are out of the specified tolerances in term of frequency and/or voltage amplitudes.

The grid power limitation may be constant if it is determined by the electrical distribution or may be variable in other cases. A control device orchestrates all the operations, it can communicate with the load (sending signals $S_{CL}$ and receiving signals $S_{LC}$), with the multifunction UPS (sending signals $S_{CU}$ and receiving signals $S_{UC}$) and with the battery (sending signals $S_{CB}$ and receiving signals $S_{BC}$).

Inverter and rectifier bridges may be referred to as switched voltage sources $u_{swi}$ and $u_{swr}$ respectively. The two converters are completed with their LC respectively LCL harmonic filters ($L_i$, $C_i$ respectively $L_r$, $C_r$, $L_{rg}$). Three switches are included, the grid switch K, the bypass switch $K_{byp}$ and the inverter switch $K_{inv}$. The UPS may also contain an additional switch for the rectifier. Typically, the inverter control controls the output voltage $u_{inv}$ by modifying the voltage $u_{swi}$ through appropriate modulation of the inverter power switches in order to follow the reference voltage $u_{ref}$ whereas the rectifier control controls the current $i_{rec}$ by modifying the voltage $u_{swr}$ through appropriate modulation of the rectifier power switches in order to follow the reference current $i_{ref}$. Various control techniques can be used to control the inverter voltage and the rectifier current.

In an example, a car is connected to the supercharger (the load) and the user pushes the "charge" button on the supercharger. Through the communication included in the charging cable the car requests a power of 400 kW. The control device receives the request to deliver a power of 400 kW. As the grid is available, the control device sends a request to the UPS to close the grid switch. The control device sends a command to the load (supercharger) to limit the power absorption to 50 kW. The bypass is activated (switch $K_{byp}$ closed) and the discharge is initiated by supplying the load through the bypass with the maximal allowable power from the grid, i.e., 50 kW. The rectifier is off, i.e., no modulation is applied to the rectifier power switches.

With the inverter switch $K_{inv}$ open, the inverter is activated. The sinusoidal inverter voltage $u_{inv}$ is synchronized in phase and matched in amplitude with the grid voltage $u_{grid}$. Then the inverter switch $K_{inv}$ is commanded to close and after a programmed delay equal to the closing time of the contactor, a superimposed load share control is activated to share the total load and draw 50 kW from the grid and up to 200 kW from the inverter. Different control techniques can be used, but typically the power delivered by the inverter can be modified by modifying the phase and the amplitude of the inverter voltage $u_{inv}$. In order to obtain the desired ratio between the inverter current $i_{inv}$ and the grid current $i_{sup}$. The sequence described here can typically take a fraction of a second.

The control device sends a command to the load (supercharger) to limit the power absorption to 250 kW. The supercharger will then increase the absorbed power from 50 kW up to 250 kW.

In a third step the rectifier is used in reverse mode to provide additional power. The rectifier is controlled in current in order to provide the same current provided by the inverter, i.e. $i_{rec}$ equal to $i_{inv}$. In this way, additional 200 kW of power can be provided.

The control device sends a command to the load (supercharger) to limit the power absorption to 450 kW. The supercharger will then increase the absorbed power from 250 kW to the demanded 400 kW, at this point the grid will provide 50 kW and both the inverter and the rectifier will provide 175 kW each.

Considering a more general situation, the total power that can be supplied to the load equals two times the power of the inverter plus the power that can be delivered through the bypass. Considering a standard 200 kW UPS with only a double power battery converter (i.e., 200 kW rectifier, inverter and bypass and two 200 kW battery converters), the total power can reach 600 kW.

The grid may go away during the discharge mode. In this case, a detector will quickly determine that the grid is not available, i.e. the grid voltages are out of the specified tolerances in term of frequency and/or voltage amplitudes. In this case, the grid switch is commanded to open and at the same time, the load share control is switched off, which means that the power provided by the grid will decay from 50 kW to 0 kW. The inverter will impose the load voltage and the rectifier will keep providing the same current delivered by the inverter, i.e. $i_{rec}$ equal to $i_{inv}$. When the grid switch will physically open, both the inverter and the rectifier will provide 200 kW each.

This UPS with multifunction capabilities is completely robust against grid failures, while in a traditional BESS solution when the grid fails, the BESS needs to switch off and drop the load. The BESS will need to be restarted as a voltage source (this is called black start mode).

If the grid is not available and the car is connected to the supercharger (the load) and the user pushes the "charge" button on the supercharger. Through the communication included in the charging cable the car requests a power of 400 kW. The control device receives the request to deliver a power of 400 kW.

As the grid is not available, the control device sends a request to the UPS to open the grid switch. With the inverter switch $K_{inv}$ open, the inverter is activated. The inverter is controlled in voltage to deliver the required voltage to the load, the sinusoidal inverter voltage $u_{inv}$ is ramped up with the nominal amplitude and frequency. Then the inverter switch $K_{inv}$ is commanded to close and after a programmed delay equal to the closing time of the contactor, the bypass is activated (switch $K_{byp}$ closed) and the rectifier is used in reverse mode and controlled in current in order to provide the same current provided by the inverter, i.e. $i_{rec}$ equal to $i_{inv}$. The sequence described here may typically take a fraction of a second.

The control device sends a command to the load (supercharger) to limit the power absorption to 400 kW. The supercharger will then start drawing power increase the absorbed power from 0 kW to 400 kW.

The grid may become available during the discharge mode. In this case, while providing power to the load, the sinusoidal inverter voltage $u_{inv}$ is synchronized in phase and matched in amplitude with the grid voltage $u_{grid}$. When frequency and amplitude are matched, the grid switch is commanded to close and after a programmed delay equal to the closing time of the contactor, a load share control is activated superimposed to the inverter voltage control in order to draw 50 kW from the grid and the remaining power from the inverter and the rectifier in reverse mode. In steady state then, the grid will provide 50 kW and both the inverter and the rectifier will provide 175 kW.

In an embodiment, energy flows between multiple energy sources and loads can be controlled while providing low harmonic distortion of currents and voltages. The concept can be augmented by adding additional energy sources, e.g. photovoltaic, wind or fuel cells.

Typically, additional converters may be added to interface the additional energy sources to the DC link of the multifunction UPS.

The multifunction UPS is connected to the grid and can therefore be used to provide grid support functionalities, e.g. Enhanced Frequency Response (EFR). The charging capability may be expanded by using photovoltaic energy during the day. By using fuel cells, a virtually continuous charging capability may be provided.

While the disclosure has been illustrated and described in detail in the drawings and foregoing description, such illustration and description are to be considered illustrative or exemplary and not restrictive. The disclosure is not limited to the disclosed embodiments. Other variations to the disclosed embodiments can be understood and effected by those skilled in the art and practicing the claimed disclosure, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method for controlling an uninterruptable power supply arranged between a grid and a variable load,
   the uninterruptable power supply comprising a DC link interconnecting a rectifier connected to the grid via a grid switch, an energy storage and an inverter connected to the load, and a switchable bypass connected between the grid switch and the load and in parallel with a path formed by the rectifier, the DC link, and the inverter such that switching of the grid switch opens or closes connection of the switchable bypass and the rectifier with the grid,
   the method comprising:
      monitoring a power supply of the grid;
      comparing the power supply to a load requirement of the load; and
      if the power supply meets the load requirement,
         closing the grid switch such that the grid switch closes the connection of the switchable bypass and the rectifier with the grid; and
         switching on the bypass, to supply the load with AC current from the grid.

2. The method of claim 1, wherein the method further comprises:
   monitoring a power demand of the load and a charge level of the energy storage; and
   if there is a power surplus, where the power supply is higher than the power demand, and if the charge level is below a predetermined level,
   activating the rectifier in a rectifying mode to rectify surplus AC current from the grid to DC current supplied to the DC link; and
   charging the energy storage with the DC current.

3. The method of claim 1, wherein the method further comprises:
   monitoring a power demand of the load; and
   if there is a power shortfall, where the power supply is lower than the power demand,
   the method further comprises:
      signaling the power shortfall to the load.

4. The method of claim 3, wherein the method further comprises:
- synchronizing the inverter to the grid in an inverting mode to invert DC current from the DC link to AC current to supply the power shortfall; and
- discharging the energy storage.

5. The method of claim 4, wherein
if the power shortfall is bigger than an inverting capacity of the inverter, the method further comprises:
- synchronizing the rectifier to the grid in an inverting mode; and
- inverting DC current from the DC link to AC current supplied to the load via the bypass.

6. The method of claim 1, wherein
if the power supply is below the load requirement but meets a rectifier requirement,
closing the grid switch;
switching off the bypass;
activating the rectifier in a rectifying mode to rectify AC current from the grid to DC current supplied to the DC link; and
activating the inverter in an inverting mode to invert DC current from the DC link to AC current supplied to the load.

7. The method of claim 6, wherein
if there is a power shortfall,
the method further comprises:
- discharging the energy storage.

8. The method of claim 6, wherein
if a charge level of the energy storage is below a predetermined level and if there is a power surplus,
the method further comprises:
- charging the energy storage.

9. The method of claim 1, wherein
if the power supply is below a rectifier requirement,
the method further comprises:
- opening the grid switch;
- activating the inverter in an inverting mode to invert DC current from the DC link to AC current supplied to the load; and
- discharging the energy storage.

10. The method of claim 9, wherein
if a power demand is bigger than an inverting capacity of the inverter,
the method further comprises:
- switching on the bypass; and
- assisting the inverter by operating the rectifier in an inverting mode to invert DC current from the DC link to AC current supplied to the load via the bypass.

11. The method of claim 5, further comprising:
balancing the inverter and the rectifier.

12. A control device for an uninterruptable power supply, configured to execute the method of claim 1.

13. An uninterruptable power supply with a control device of claim 12.

14. A computer program, which when being executed by a processor, is adapted for performing the method of claim 1.

15. A computer-readable medium, wherein a computer program according to claim 14 is stored.

16. The method of claim 10, further comprising:
balancing the inverter and the rectifier.

* * * * *